(12) United States Patent
Sorisho

(10) Patent No.: US 7,565,375 B2
(45) Date of Patent: Jul. 21, 2009

(54) COMPUTER SYSTEM, METHOD AND SOFTWARE FOR ACQUIRING, EVALUATING, CONFORMING, CLASSIFYING AND STORING ON A SERVER A DIGITAL MEDIA FILE FROM A CLIENT TO ESTABLISH OR CREATE A DIGITAL MEDIA FILE HAVING A BANDWIDTH COMPATIBLE WITH CLIENT'S ACCOUNT FOR DELIVERY TO THIRD

(76) Inventor: Ronald Sorisho, 6481 Hirabayashi Dr., San Jose, CA (US) 95120

( * ) Notice: Subject to any disclaimer, the term of this patent is extended or adjusted under 35 U.S.C. 154(b) by 257 days.

(21) Appl. No.: 11/604,173

(22) Filed: Nov. 24, 2006

(65) Prior Publication Data

US 2007/0156440 A1    Jul. 5, 2007

(51) Int. Cl.
*G06F 7/00* (2006.01)
(52) U.S. Cl. .................................. 707/102; 707/104.1
(58) Field of Classification Search ............... 707/8–10, 707/100, 101, 102, 104.1
See application file for complete search history.

(56) References Cited

U.S. PATENT DOCUMENTS

| | | | |
|---|---|---|---|
| 6,925,469 B2 * | 8/2005 | Headings et al. ............ | 707/102 |
| 7,100,195 B1 * | 8/2006 | Underwood .................. | 726/2 |
| 2003/0001880 A1 * | 1/2003 | Holtz et al. ................. | 345/716 |
| 2006/0161604 A1 * | 7/2006 | Lobo .......................... | 707/203 |
| 2006/0272028 A1 * | 11/2006 | Maes .......................... | 726/27 |

* cited by examiner

Primary Examiner—Wilson Lee
(74) Attorney, Agent, or Firm—J G Mullins; Z-PRO IP Consulting

(57) ABSTRACT

The present invention generally provides a computer digital media files and server management system, including client billing system software and file management software that contain software logic for receiving and transmitting digital media in a network environment in a bandwidth manner that is compatible with a server client's account. Client server accounts are segmented based on both file size for storage on the server and a pre-defined "range of data" for digital media that can be transmitted to third parties for the server client in a fixed amount of time, in bits per second, which are respectively, the client's established server file storage size and digital media transmission account rate. The invention provides software logic and an interface for a server client to choose both a server file storage size and a digital media transmission account rate.

17 Claims, 2 Drawing Sheets

COMPUTER SYSTEM, METHOD AND SOFTWARE FOR ACQUIRING, EVALUATING, CONFORMING, CLASSIFYING AND STORING ON A SERVER A DIGITAL MEDIA FILE FROM A CLIENT TO ESTABLISH OR CREATE A DIGITAL MEDIA FILE HAVING A BANDWIDTH COMPATIBLE WITH CLIENT'S ACCOUNT FOR DELIVERY TO THIRD

FIELD OF THE INVENTION

The field of the present invention relates generally to a computer digital media files and server management system, including client billing system software and file management software that contain software logic for receiving and transmitting digital media in a network environment in a bandwidth manner that is compatible with a server client's account. Client server accounts are segmented based on both file size for storage on the server and a pre-defined "range of data" for digital media that can be transmitted to third parties for the server client in a fixed amount of time, in bits per second, which are respectively, the client's established server file storage size and digital media transmission account rate. The invention provides software logic and an interface for a server client to choose both a server file storage size and a digital media transmission account rate.

BACKGROUND OF THE INVENTION

More powerful computers and ready internet access (also know as the World Wide Web) have increased the popularity of digital multimedia transmission over the internet and receipt for use by computers attached to the internet. Servers attached to the internet act as a large repository of still and movie style image files which can be streaming or downloaded for viewing, storing and/or printing. For example, web pages that are available at servers hosting web sites on the internet often include digital image files that can be downloaded by visitors to the web site or accessed by those visitors via streaming media. There are several complications for digital file providers and end user, including cost of storage for digital media files on the server, cost of bandwidth for transmission of files to end users from the server and limitations on bandwidth and file format from the computer type and internet connection type of end users, as well as the length of time for transmission to end users.

As mentioned above, major problem with streaming or down-loading digital image files from servers on the internet are file size and bandwidth constraints from the perspectives of both the end user and the provider. Since digital image files tend to have a large size, a large storage space and a high bandwidth are needed for transmission of graphical image files in acceptable amounts of time. This cost can be mitigated by one or more techniques of using a link to a digital server optimized for file storage and transmission, by reducing the quality of the digital image files, reducing the end user's viewing image size, or adjusting the file format to a form that can be transmitted within an acceptable period of time for the type of connection of the end user (i.e., many digital media providers ask the end user to choose (i) their digital media player type, such as Windows Media Play, Real Player and the like, and (ii) internet connection type, such as dial-up modem or broadband connection type before transmitting a digital file). The bandwidth constraints are primarily due to how user's computers connect to the Internet.

Compression techniques can sometimes be used to provide a higher quality digital image to the end user with a reduced file size, reduced transmission time, or both. However, most compression techniques have a negative impact on the quality of a digital image, such as distortion. Consequently, compression may help with the bandwidth constraints but it does not really solve the problem.

Many websites and servers are not optimized for digital image transmission and some have begun to leave this service to more expert providers. For example, a websites can provide to end users a link to a digital image file that is not located on the same server as the websites, but is located on a server that is optimized for digital image transmission. In some cases, a client located on a websites server can provide an uncontrolled open link to the same or a different digital image file server for end users to access the digital image file from a digital image server. Or, a client can send an email (or a secured transmission) to a targeted digital image file end user to provide a link (or link and/or secured log-in information) to the digital image file on another special digital image file server in order to limit the bandwidth cost of providing digital image files. This can permit a digital image server client to limit end users with access to the digital media files to a preferred group that is decided upon by the client in order to help control costs.

Even in the above cases, there is a need for improved systems, software and techniques for storage and transmission of graphical image files in a network environment so that the storage space and available bandwidth are used more efficiently. There is also a need in real time for a digital image server client who is providing digital image file access to third parties to be able in advance of receiving an invoice for services to estimate, predict, manage and control their costs for providing digital image file access to end users. There is a further need for computer systems and software that will assist a digital image server client with accomplishing such results.

DEFINITIONS

The following non-exhaustive list of definitions is used herein to define terms that may otherwise be confusing or can sometimes have multiple meanings. Each occurrence of a defined term in the above text, in the text that follows, or in the claims of this document, is to be given the meaning ascribed to it in the list of definitions below.

"Instance" as referred to in this document in the context of computer software applications is a single occurrence of a software logical element in the memory of a computer system, such as a "class", an "object", a "data object", and the like.

"Class" as referred to in this document in the context of computer software applications is a logic unit in a computer application or a computer software program where the application or program is based upon an object oriented programming language (e.g., Java). In practice, a class is a logical unit used as a logical template in an object oriented language from which to allocate new instances of objects.

"Object" as used in the context of this document is a general term referring to a logic unit in a computer application or a computer software program where the application or program is based upon an object oriented programming language (e.g., Java). The term "object" may ordinarily be used interchangeably with the term "class" as a template or as an instance depending on the context.

"Data object" as referred to in the context of this document represents the concept of the occurrence of an object that holds data within a specific computer application domain and is likely to have its contents stored in a persistent data source of a computer system (e.g., a database server, a binary file, a text file, or even in a combination of two or more of such a persistent data sources of a computer system). A data object may exist as an independent data object without any relationship to any other data object or it may have one or more relationships with itself or with one or more other data objects.

"Metadata" as referred to in the context of this document represents the concept data about data. As a non-limiting example, a data object as described above may include not only data that is incorporated within the data object from a data store, but may also include one or more kinds of metadata: descriptors of that data, how the data relates to other data, how the data object relates organizationally (schema link(s)) to other data objects, who may access, update or change the data, or how the data may be utilized. In data object corresponding to digital media files the metadata may include information about the total file size, the bit-rate, resolution and the like.

"Range of data" as used in the context of this document refers to the transmission of digital media files as data wherein the transmission may be thought of in terms of three dimensional parameters (i) data window size (height and width) with a limit for data resolution, (ii) flow rate through the data window, and (iii) pressure behind the flow to force compression or decompression to increase the effective amount of data flowing through the bottleneck of the data window. One or more of the three dimensional parameters of digital media data transmission may be set to establish a range of data setting for data transmission.

"Complex data object" as used in the context of this document refers to the occurrence of a data object that has at least one or more relationships with itself, or at least one or more relationships with one or more other data object(s). In a given instance of a complex data object at least one relationship is populated as a link, as defined below. A complex data object may have a multiplicity of different relationships with itself or with one or more additional complex data objects.

"Relationship" or "data relationship" as used in the context of a complex data object refers to the type of logical combination that occurs between a data object with itself, or refers to the type of logical combination that occurs between a data object and at least one another data object. Among other references or descriptions, such a relationship is always referred to or partially described by a "relationship type". This term is used in an object oriented language context to reference or describe any expectations, actions and limitations possible between two or more data objects.

"Relationship type" in the context of this document is a metadata label that specifies the possible multiple combinations that can occur between a complex data object and itself or with at least one other complex data object. The possible relationship type labels are 1-1 (one to one), 1-M (one to many) and M-M (many to many). A given complex data object may be simultaneously related to more than one other complex data objects through several different types of relationship.

"Link" as used in this document with respect to a complex data object identifies a particular occurrence of a relationship between a complex data object and itself, or between a complex data object and another complex data object. The occurrence of at least one populated link results in an instance of a complex data object.

"Circular link" as used in this document with respect to a complex data object identifies a particular occurrence of a relationship between a complex data object and itself that may be direct or indirect (e.g., linked to itself through another complex data object).

"Relationship definition" or "relationship description" in the context of this document and computer software applications refers to information, or an abstraction of information, regarding a "relationship", "data relationship" "relationship type" or a "link" that can be stored, accessed, transferred, communicated, displayed or edited.

"Complex data object graph" is a term that may be employed herein as an abstraction to logically represent a set of complex data objects and a set of their corresponding relationships.

"Java data object graph" is a term that may be employed herein as an abstraction to logically represent a set of complex data objects and a set of their corresponding relationships that are part of a Java programming application.

"Application model" or simply "model" are essentially interchangeable terms employed herein as abstractions to logically convey a collective description or other representation for a set of complex data objects and a corresponding description or other representation of their relationships. In one respect, these terms are used logically herein provide a general way of efficiently communicating when referring to set of metadata (i.e., data about data) that describes possible data entities (e.g., objects, database tables, maps, etc,) data relationship types, and data constraints involved in a computer system or application, or in a specific instance of an application. It is important to understand the context in which the terms "application model" and "model" are used in this document. Ordinarily computer engineers refer to the "model" as an abstraction rather than a specific possibility or instance of the model as applied. However, in this document for the ease of communication abstractions of the model, possible implementations of the model and instances of the model are all referred to generally as "application model" or "model". From the context of its use the term will be clear.

"Navigation", "navigating" or "navigated" in the context of the present document refers to an action implementing at least one object to interact with a set of related objects for a certain purpose, such as creation, access, insertion, modification and deletion of an object, or of one of its relationships.

"Navigation model" as used herein is a special type of application model that is applied specifically to a description (or other representation) of how objects can relate to each other and what might be the expected behavior when a complex data object graph is navigated for a certain purpose.

"Object schema" is a term employed herein as an abstraction referring to the set of data object classes that describe the possible data objects that can be created, modified or maintained in an application, or describing an instance of a set of data object classes in an application.

SUMMARY OF THE INVENTION

An object of the present invention is to provide a local or distributed computer digital media file repository and server management system, comprising a user interface, a working memory storage area and at least one device for permanently storing information, wherein a portion of said memory of said system is loaded with at least one portion of a computer software program containing logic for at least one digital media client billing system software and file management software including logic for receiving and transmitting digital media in a network environment in a bandwidth manner that is compatible with at least one digital media server client's account wherein:

(a) the at least one server client digital media account is segmented based on both files size for storage on the digital media server, or on an associated distributed digital media storage location, and a pre-defined "range of data" for transmitting digital media, (b) the system contains software logic permitting the digital media file repository and server management system to examine one or more of the metadata and file of a client provided digital media file to determine the digital media file type and size, (c) the system contains software logic permitting the digital media file repository and server management system to examine one or more of the metadata and file of a client provided digital media file to determine the resolution of the digital media file type, the bit-rate and time, and the bandwidth size necessary to transmit the digital media file either to the digital media server client or to a third party with permission of the digital media server client, (d) the system contains software logic permitting the information collected in (b) and (c) above to determine if the client provided digital media file is a conforming or non-conforming digital media file for the server digital media account as described in (a), and (e) the system contains software logic permitting the system to store and utilize a conforming client provided digital media file, and to either reject non-conforming digital media files or to adjust them to conform to the server digital media account.

A preferred object of the present invention is to provide a local or distributed computer digital media file repository and server management system as described above, that further provides an interface for a server digital media client to establish a server digital media account with a budget or credit permitting one storage of digital media files on the server up to a certain total file size and establishing a digital file transmission account rate.

Another object of the present invention is to provide a local or distributed computer digital media file repository and server management system as described above, wherein the digital media client is provided with software logic and an interface that permits the digital media client to establish or update their digital media account by setting a file transmission resolution parameter, as bits per second transmission rate parameter, and a total file size transmission time limit per a billing period.

A preferred object of the present invention is to provide a local or distributed computer digital media file repository and server management system as described above, wherein the digital media client is provided with software logic and an interface that permits real-time monitoring of account use and account status.

In another preferred object of the present invention, it is to provide a local or distributed computer digital media file repository and server management system as described above, wherein the digital media client is provided with software logic and an interface that permits real-time adjusting of account parameters during a billing- period for the account.

It is a still further object of the present invention to provide a software module, or set of modules, for creating or maintaining a local or distributed computer digital media file repository and server management system, comprising logic for at least one digital media client billing system software or file management software including logic for receiving and transmitting digital media in a network environment in a bandwidth manner that is compatible with at least one digital media server client's account wherein:

(a) the software logic provides for segmenting of at least one server client digital media account based on both file size for storage on the digital media server, or on an associated distributed digital media storage location, and a pre-defined "range of data" for transmitting the digital media to the digital media server client or to a third party with permission of the digital media server client, (b) the software module or modules contain software logic permitting the digital media file repository and server management system to examine one or more of the metadata and file of a client provided digital media file to determine the digital media file type and size, (c) the software module or modules contain software logic permitting the digital media file repository and server management system to examine one or more of the metadata and file of a client provided digital media file to determine the resolution of the digital media file type, the bit-rate and time, and the bandwidth size necessary to transmit the digital media file either to the digital media server client or to a third party with permission of the digital media server client, (d) the software module or modules contain software logic permitting the information collected in (b) and (c) above to determine if the client provided digital media file is a conforming or non-conforming digital media file for the server digital media account as described in (a), and (e) the software module or modules contain software logic permitting the system to store and utilize a conforming client provided digital media file, and to either reject non-conforming digital media files or to adjust them to conform to the server digital media account.

A preferred object of the present invention is to provide such a software module, or set of modules, as described above, and further providing software logic for an interface that permits a server digital media client to establish a server digital media account with a budget or credit permitting one storage of digital media files on the server up to a certain total file size and establishing a digital file transmission account rate. In a further preferred object, the software module, or set of modules provide the digital media server client with software logic and an interface that permits the digital media server client to establish or update their digital media account by setting a file transmission resolution parameter, as bits per second transmission rate parameter, and a total file size transmission time limit per a billing period.

Another object of the invention is to provide such a software module, or set of modules, wherein the software module, or set of modules provides the digital media server client with software logic and an interface that permits real-time monitoring of account use and account status by the digital media server client. A more preferred object would be to provide such a software module, or set of modules, that provide the digital media server client with software logic and an interface that permits real-time adjusting of account parameters during a billing period by the digital media server client.

BRIEF DESCRIPTION OF THE DRAWINGS

For the non-limiting purpose of illustrating some of the concepts to provide an example of an implementation of the local or distributed computer digital media file repository and server management system according to the invention, as two drawings FIG. 1 and FIG. 2 are provided.

DESCRIPTION THE INVENTION

The present invention provides a local or distributed computer digital media file repository and server management system, comprising a user interface, a working memory storage area and at least one device for permanently storing information, wherein a portion of said memory of said system is loaded with at least one portion of a computer software program containing logic for at least one digital media client billing system software and file management software including logic for receiving and transmitting digital media in a network environment in a bandwidth manner that is compatible with at least one digital media server client's account wherein:
  (a) the at least one server client digital media account is segmented based on both files size for storage on the digital media server, or on an associated distributed digital media storage location, and a pre-defined "range of data" for transmitting digital media,
  (b) the system contains software logic permitting the digital media file repository and server management system to examine one or more of the metadata and file of a client provided digital media file to determine the digital media file type and size,
  (c) the system contains software logic permitting the digital media file repository and server management system to examine one or more of the metadata and file of a client provided digital media file to determine the resolution of the digital media file type, the bit-rate and time, and the bandwidth size necessary to transmit the digital media file either to the digital media server client or to a third party with permission of the digital media server client,
  (d) the system contains software logic permitting the information collected in (b) and (c) above to determine if the client provided digital media file is a conforming or non-conforming digital media file for the server digital media account as described in (a), and
  (e) the system contains software logic permitting the system to store and utilize a conforming client provided digital media file, and to either reject non-conforming digital media files or to adjust them to conform to the server digital media account.

The present invention also provides a local or distributed computer digital media file repository and server management system as described above, that further provides an interface for a server digital media client to establish a server digital media account with a budget or credit permitting one storage of digital media files on the server up to a certain total file size and establishing a digital file transmission account rate.

In another embodiment, the present invention provides a local or distributed computer digital media file repository and server management system as described above, wherein the digital media client is provided with software logic and an interface that permits the digital media client to establish or update their digital media account- by setting a file transmission resolution parameter, as bits per second transmission rate parameter, and a total file size transmission time limit per a billing period.

In a preferred embodiment, the present invention provides a local or distributed computer digital media file repository and server management system as described above, wherein the digital media client is provided with software logic and an interface that permits real-time monitoring of account use and account status.

In another preferred embodiment the present invention provides a local or distributed computer digital media file repository and server management system as described above, wherein the digital media client is provided with software logic and an interface that permits real-time adjusting of account parameters during a billing period for the account.

In a still further embodiment the present invention there is provided a software module, or set of modules, for creating or maintaining a local or distributed computer digital media file repository and server management system, comprising logic for at least one digital media client billing system software or file management software including logic for receiving and transmitting digital media in a network environment in a bandwidth manner that is compatible with at least one digital media server client's account wherein:
  (a) the software logic provides for segmenting of at least one server client digital media account based on both file size for storage on the digital media server, or on an associated distributed digital media storage location, and a pre-defined "range of data" for transmitting the digital media to the digital media server client or to a third party with permission of the digital media server client,
  (b) the software module or modules contain software logic permitting the digital media file repository and server management system to examine one or more of the metadata and file of a client provided digital media file to determine the digital media file type and size,
  (c) the software module or modules contain software logic permitting the digital media file repository and server management system to examine one or more of the metadata and file of a client provided digital media file to determine the resolution of the digital media file type, the bit-rate and time, and the bandwidth size necessary to transmit the digital media file either to the digital media server client or to a third party with permission of the digital media server client,
  (d) the software module or modules contain software logic permitting the information collected in (b) and (c) above to determine if the client provided digital media file is a conforming or non-conforming digital media file for the server digital media account as described in (a), and
  (e) the software module or modules contain software logic permitting the system to store and utilize a conforming client provided digital media file, and to either reject non-conforming digital media files or to adjust them to conform to the server digital media account.

A preferred embodiment of the present invention provides such a software module, or set of modules, as described above, and further providing software logic for an interface that permits a server digital media client to establish a server digital media account with a budget or credit permitting one storage of digital media files on the server up to a certain total file size and establishing a digital file transmission account rate. In a further preferred embodiment of the invention, the software module, or set of modules provide the digital media server client with software logic and an interface that permits the digital media server client to establish or update their digital media account by setting a file transmission resolution parameter, as bits per second transmission rate parameter, and a total file size transmission time limit per a billing period.

Another embodiment of the invention provides such a software module, or set of modules, wherein the software module, or set of modules provides the digital media server client with software logic and an interface that permits real-time monitoring of account use and account status by the digital media server client. A more preferred embodiment provides such a software module, or set of modules, that presents to the digital media server client software logic and an interface that permits real-time adjusting of account parameters during a billing period by the digital media server client.

In a preferred embodiment, the present invention provides a local or distributed computer digital media file repository and server management system with a file classification system ("class" or "classes") which enables the system managers to control and regulate the flow of data-bits through data communication lines.

In the above implementation, the classes are segmented based on specified amount of data that can be transmitted in a fixed amount of time, usually in bits per second ("bit-rate"). Each class is a virtual repository for electronic media files ("files") which are placed there by the digital media server client user for later use. The digital media server client can put a file in a class by uploading, transferring, copying, or directly creating it in that class ("copy" or "copying").

According to the invention, in order for a file to be put in a class, it has to first be accepted. The acceptance criteria for each file are based on its bit-rate and whether or not it meets or exceeds the bit-rate specified for that class. If the bit-rate for the file exceeds the bit-rate limit set for that class, then the file is not accepted. For files which are not accepted as a result of this logic, the software module or modules contain software logic permitting the system to store and utilize a conforming client provided digital media file, and to either reject non-conforming digital media files or to adjust them to conform to the server digital media account. Conversely, if the bit-rate for the file is equal to or less than the bit-rate limit set for that class, then the file is accepted.

To help implement and manage this file classification system, the present invention utilizes software providing logic that includes a policy which allows the digital server client to specify and maintain the bit-rate values for classes in their account. These values can change from time to time by updating the policy on their account, which is a digital server client account.

In order to copy files into the classes for storage on the server and distribution, the software has a built-in logic mechanism which provides access to metadata associated with media files such as ASF (Microsoft WMV and WMA files), RM (RealMedia RM and RMA files), MOV (Apple QuickTime MOV files) and MPEG-4 (various MPEG-4 files such as MP4, M4A or 3GP). The metadata retrieved from these files include but are but are not limited to such fields as file type, bit-rate, duration, & size.

Most media files have fixed headers, and knowing about the location of the file headers and their size would be enough to retrieve the metadata needed. However, some media files such as MOV don't have fixed headers but the metadata chuck can be located at any part of the media file.

The logic of the system scans a proffered file's metadata and retrieves the file size, resolution and bit-rate from the file. If a bit-rate value is not present in the metadata, the software includes logic to retrieve and use other necessary information from the file in order to calculate its bit-rate. To perform this calculation, the software logic obtains values from the file such as file size and duration (length of the content) to perform the following calculation:

$$\text{Bit-rate}=[8.388608\times\text{Size of File}]/\text{Length}$$

Once the software logic associated with the server obtains or calculates a bit-rate associated with a file, it then performs a comparison to the bit-rate value in the specified class for the digital media server client. If the bit-rate for the file exceeds the bit-rate limit set for that class, then the file is not accepted. Conversely, if the bit-rate for the file is equal to or less than the bit-rate limit set for that class, then the file is accepted and copying is allowed to complete. In a preferred aspect, the invention provides software logic to conform a non-conforming file into a file that is compatible with a class associated with a digital media server client account and an interface to update or change class parameters to permit the file to be classified in a revised class, or both.

The software logic according to the invention, irrespective of the digital media file type, provides a common interface to retrieve metadata associated with media files. Metadata information can be retrieved by specifying a media file name or a file stream. For example, in a preferred embodiment of the invention, an object programming language class named "MediaInfo" is utilized as abstract class and contains logic for all the different media files to implement this abstract class to handle locating headers and extracting the required metadata.

In a preferred embodiment, a digital media file server client can specify whether the display window size, the resolution per unit of size, or both are utilized to provide files that meet a class for the account. The software according to the invention provides software modules of logic to implement the setting for a class to conform it to a certain class for that account.

Figure 1:
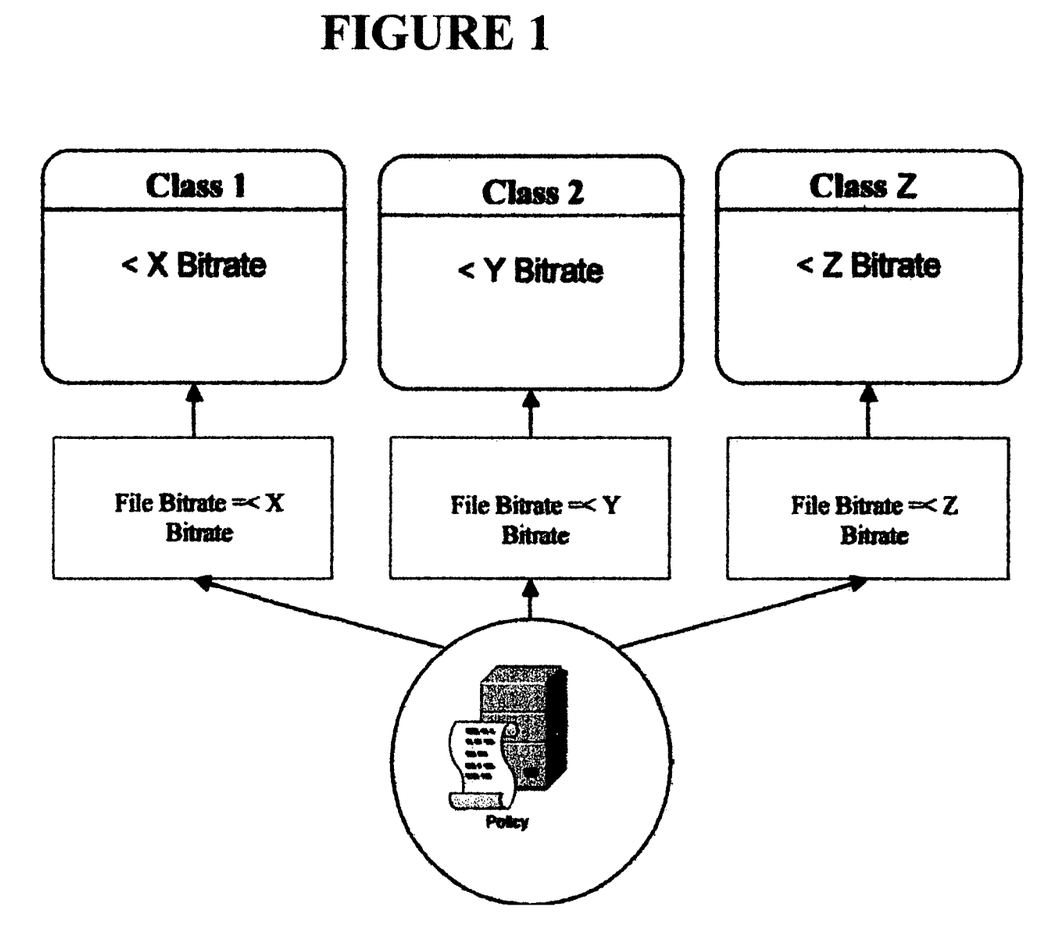
FIG. 1 is a drawing that illustrates an implementation of bit-rate classification system for a local or distributed computer digital media file repository and server management system according to the invention. Class 1 and Class 2 illustrate pre-set classes for a digital media data file. Class Z illustrates a dynamic class for a digital media data file.
Figure 2:
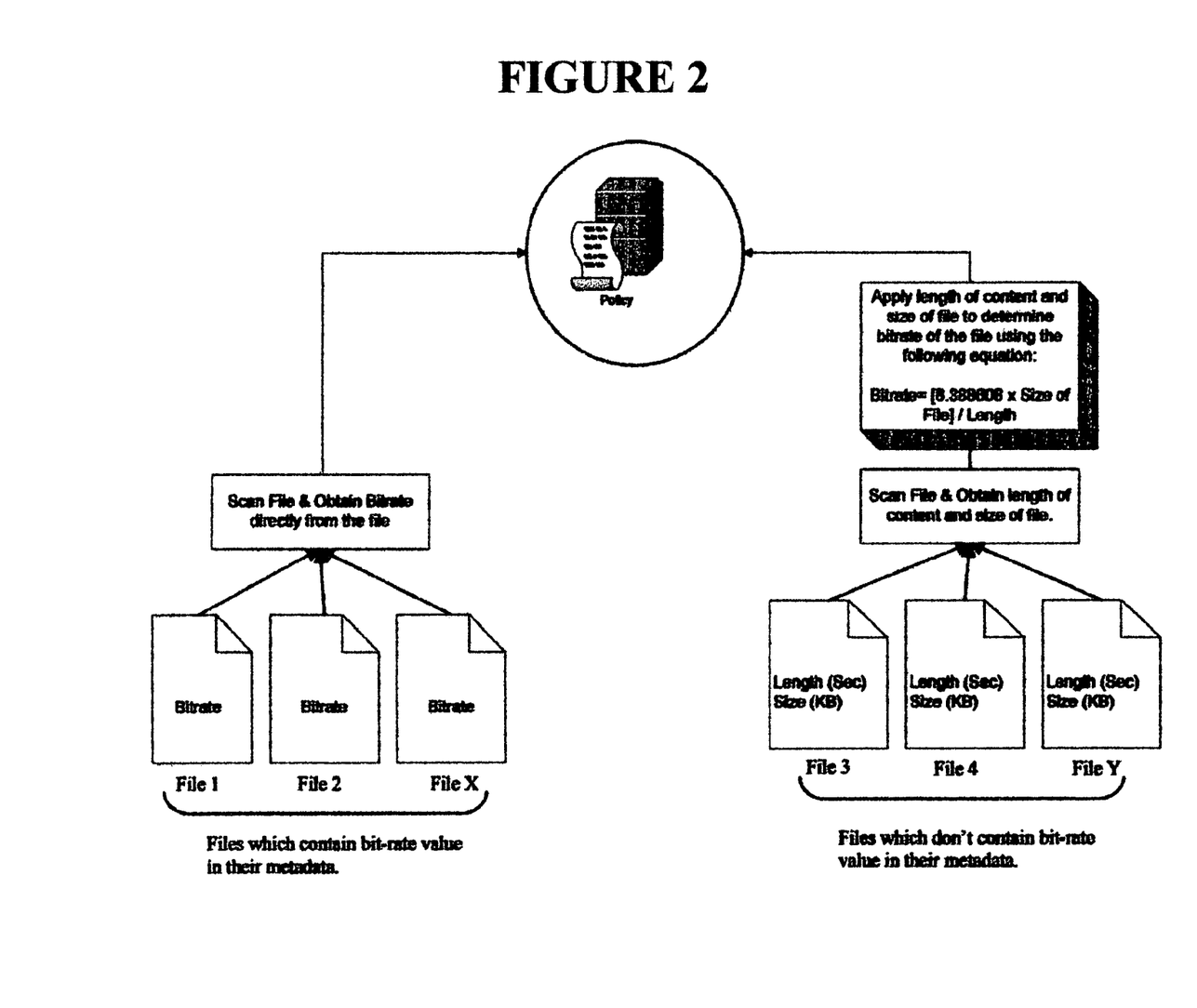
FIG. 2 is a drawing that illustrates an implementation of the software logic and system for a local or distributed computer digital media file repository and server management system according to the invention. In this illustration, a method is used to examine a file to determine its file size and parameters in order to classify the digital media data file.

In a still further embodiment of the invention, the digital media client can set parameters for transmission rates and resolution for third parties. The rates can be fixed as show in FIG. 1, or the rates can be dynamic and chosen by the third party for transmission of the digital media file. In a still further preferred aspect, the invention provides software logic and an interface for a third party to specify one or more of their system specifications or limitations so that their transmission rates and resolution that are offered to that party that are compatible with the digital server client account.

In this preferred aspect, the invention relates includes logic and techniques for transmitting graphical images in a network environment wherein the amount of data of the graphical images that is transmitted for each of the graphical images is adjusted to conform to the digital media server client and the third party to whom the media is be transmitted. This logic and techniques enable graphical images to be transmitted with more flexibility and efficiently with the ability of the digital media server client to control cost while providing an acceptable transmission rate and resolution to satisfy the third party to whom the media is being transmitted by the digital media server. As a result, the amount of data transmitted is tailored for the particular account and the particular third party situation. Excess data is not transmitting when the third party does not need or desire it, or the digital media server client does not wish to pay for such levels of transmission. Of course, a class can be chosen by digital media server client and a third party file user so that a very high quality image can be provided when desired. Accordingly, the invention allows a digital server client to establish a rate of data for an account to provide a bandwidth or set of bandwidth and then makes significantly better and more intelligent use of the available bandwidth(s) within a network environment. The invention can be implemented in numerous ways, including as a method, process, system, and a computer readable media.

In a preferred embodiment, the invention provides software logic and object language classes that are capable of dynamically adjusting a file of a high resolution to provide a lower resolution file for transmission or to provide a slower rate of transmission for a higher resolution file.

In yet another embodiment of the present invention there is provided a software implemented method for creating or maintaining a local or distributed computer digital media file repository and server management system, comprising method steps that implement software logic for at least one digital media client billing system software or file management software including method steps utilizing logic for receiving and transmitting digital media in a network environment in a bandwidth manner that is compatible with at least one digital media server client's account wherein:
  (a) utilizing a software implemented method step comprising software logic that provides for segmenting of at least one server client digital media account based on both file size for storage on the digital media server, or on an associated distributed digital media storage location, and a pre-defined "range of data" for transmitting the digital media to the digital media server client or to a third party with permission of the digital media server client,
  (b) utilizing a software implemented method step comprising software logic permitting the digital media file repository and server management system to examine one or more of the metadata and the file of a client provided digital media file to determine the digital media file type and size,
  (c) utilizing a software implemented step comprising software logic permitting the digital media file repository and server management system to examine one or more of the metadata and the file of a client provided digital media file to determine the resolution of the digital media file type, the bit-rate and time, and the bandwidth size necessary to transmit the digital media file either to the digital media server client or to a third party with permission of the digital media server client,
  (d) utilizing a software implemented step comprising software logic permitting logical application of the information collected in (b) and (c) above to determine if the client provided digital media file is a conforming or non-conforming digital media file for the server digital media account as described in (a), and
  (e) utilizing a software implemented method step comprising software logic permitting the system to store and utilize a conforming client provided digital media file, and to either reject non-conforming digital media files or to adjust them to conform to the server digital media account.

A preferred embodiment of the present invention provides such a method as described above, and further providing at least software implemented method step comprising software logic for an interface that permits a server digital media client to establish a server digital media account with a budget or credit permitting one storage of digital media files on the server up to a certain total file size and establishing a digital file transmission account rate. In a further preferred embodiment of the invention, the software implemented method steps provide the digital media server client with software logic with a user interface that permits the digital media server client to establish or update their digital media account by setting a file transmission resolution parameter, as bits per second transmission rate parameter, and a total file size transmission time limit per a billing period.

Another embodiment of the invention provides such software implemented method steps provide provide the digital media server client with software implemented logic and an interface that permits real-time monitoring of account use and account status by the digital media server client. A more preferred embodiment provides such method steps that present to the digital media server client software logic having an interface that permits real-time adjusting of account parameters during a billing period by the digital media server client.

In a preferred embodiment, the present invention provides such methods and software logical in communication with a local or distributed computer digital media file repository and a server management and control system comprising a file classification system ("class" or "classes") which enables one or more system managers to control and regulate the flow of data-bits through data communication lines.

According to the invention, in order for a file to be put in a class, it has to first be accepted. The acceptance criteria for each file are based on its bit-rate and whether or not it meets or exceeds the bit-rate specified for that class. If the bit-rate for the file exceeds the bit-rate limit set for that class, then the file is not accepted. For files which are not accepted as a result of this logic, the software implemented methods contain software logic permitting the system to store and utilize a conforming client provided digital media file, and to either reject non-conforming digital media files or to use software or hardware implemented methods to adjust them to conform to the server digital media account. Conversely, if the bit-rate for the file is equal to or less than the bit-rate limit set for that class, then the software implemented methods contain logic to accept the conforming file.

To help implement and manage this file classification system, the present invention utilizes software implemented methods providing logic that includes a policy which allows the digital server client to specify and maintain the bit-rate values for classes in their account. These values can change from time to time by updating the policy on their account utilizing software implemented methods and logic, which is a digital server client account.

In order to copy files into the classes for storage on the server and distribution, the method steps include software implemented method steps that utilize a built-in logic mechanism which provides access to metadata associated with media files such as ASF (Microsoft WMV and WMA files), RM (RealMedia RM and RMA files), MOV (Apple QuickTime MOV files) and MPEG-4 (various MPEG-4 files such as MP4, M4A or 3GP). The software implemented methods include logic to retrieve metadata from these files that includes metadata related to but not limited to such fields as file type, bit-rate, duration, & size.

In one embodiment, the software implemented methods include steps for scanning a proffered file's metadata and retrieving the file size, resolution and bit-rate from the file. If a bit-rate value is not present in the metadata, the software includes logic to retrieve and use other necessary information from the file in order to calculate its bit-rate. To perform this calculation, the software implemented methods include logic to obtain values from the file such as file size and duration (length of the content) and to perform the following calculation:

$$\text{Bit-rate} = [8.388608 \times \text{Size of File}]/\text{Length}$$

Once the software implemented methods apply the software logic associated with the server obtains or calculate a bit-rate associated with a file, the methods then performs steps to compare the bit-rate observed with the value in the specified class for the digital media server client. If the bit-rate for the file exceeds the bit-rate limit set for that class, then the software implements will classify the file as non-conforming. Conversely, if the bit-rate for the file is equal to or less than the bit-rate limit set for that class, then the file is accepted and copying is allowed to be completed. In a preferred aspect, the invention provides software implemented method steps including software logic with the ability to conform a non-conforming file into a file that is compatible with a class associated with a digital media server client account and, optionally, to provide the client with an interface to update or to change class parameters in order to permit the file to be classified in a revised class, or both.

Such a local or distributed computer digital media file repository and server management system contains logic and methods that are adapted to provide server storage and transmission of digital media files in an efficient manner, which are compatible with both the digital media server client account and with the equipment and communication connection limitations of the third party to whom the transmission is being provided by the digital media server client in order to maximize available resources of the third part and manage account budgets for digital. media server client.

The present invention may be embodied in specific forms other than those particularly described above or illustrated by the appended drawings. Upon viewing the present application preferred embodiments and other descriptions herein of the present invention, variations and other implementations that do not depart from the spirit and scope of the present invention will be apparent to one of routine skill in this field. Such variations and other implementations are considered part of the present invention and within the scope of the appended claims. Accordingly, reference should be made to the appended claims, rather than to the forgoing specification and drawings, as indicating the scope of the present invention.

I claim:

1. A local or distributed computer digital media file repository and server management system, comprising a user interface, a working memory storage area and at least one device for permanently storing information, wherein a portion of said memory, of said system, stores with at least one portion of a computer software program, is executable by a processor, containing logic for at least one digital media client billing system software or file management software including logic for receiving and transmitting digital media in a network environment in a bandwidth manner that is compatible with at least one digital media server client's account wherein:
    (a) the at least one server client digital media account is segmented based on both file size for storage on the digital media server, or on an associated distributed digital media storage location, and a pre-defined "range of data" for transmitting the digital media to the digital media server client or to a third party with permission of the digital media server client,
    (b) the system contains computer-executable software logic permitting the digital media file repository and server management system to examine one or more of the metadata and file of a client provided digital media file to determine the digital media file type and size,
    (c) the system contains computer-executable software logic permitting the digital media file repository and server management system to examine one or more of the metadata and file of a client provided digital media file to determine the resolution of the digital media file type, the bit-rate and time, and the bandwidth size necessary to transmit the digital media file either to the digital media server client or to a third party with permission of the digital media server client,
    (d) the system contains computer-executable software logic permitting the information collected in (b) and (c) above to determine if the client provided digital media file is a conforming or non conforming digital media file for the server digital media account as described in (a), and
    (e) the system contains computer-executable software logic permitting the system to store and utilize a conforming client provided digital media file, and to either reject non- conforming digital media files or to adjust them to conform to the server digital media account.

2. A local or distributed computer digital media file repository and server management system according to claim 1, further providing an interface for a server digital media client to establish a server digital media account with a budget or credit permitting one storage of digital media files on the server up to a certain total file size and establishing a digital file transmission account rate.

3. A local or distributed computer digital media file repository and server management system according to claim 2, wherein the digital media client is provided with software logic and an interface that permits the digital media client to establish or update their digital media account by setting a file transmission resolution parameter, as bits per second transmission rate parameter, and a total file size transmission time limit per a billing period.

4. A local or distributed computer digital media file repository and server management system according to claim 3, wherein the digital media client is provided with software logic and an interface that permits real-time monitoring of account use and account status.

5. A local or distributed computer digital media file repository and server management system according to claim 3, wherein the digital media client is provided with software logic and an interface that permits real-time adjusting of account parameters during a billing period.

6. A computer-executable software module, or set of modules, being stored in a memory, for creating or maintaining a local or distributed computer digital media file repository and server management system, comprising logic for at least one digital media client billing system software or file management software including logic for receiving and transmitting digital media in a network environment in a bandwidth manner that is compatible with at least one digital media server client's account wherein:
    (a) a computer-executable software logic provides for segmenting of at least one server client digital media account based on both file size for storage on the digital media server, or on an associated distributed digital media storage location, and a pre-defined "range of data" for transmitting the digital media to the digital media server client or to a third party with permission of the digital media server client,
    (b) the computer-executable software module or modules contain software logic permitting the digital media file repository and server management system to examine one or more of the metadata and file of a client provided digital media file to determine the digital media file type and size,
    (c) the computer-executable software module or modules contain software logic permitting the digital media file repository and server management system to examine one or more of the metadata and file of a client provided digital media file to determine the resolution of the digital media file type, the bit-rate and time, and the bandwidth size necessary to transmit the digital media file either to the digital media server client or to a third party with permission of the digital media server client, (d) the computer-executable software module or modules contain software logic permitting the information collected in (b) and (c) above to determine if the client provided digital media file is a conforming or non-conforming digital media file for the server digital media account as described in (a), and (e) the computer-executable software module or modules contain software logic permitting the system to store and utilize a conforming client provided digital media file, and to either reject non-conforming digital media files or to adjust them to conform to the server digital media account.

7. A software module, or set of modules according to claim 6, further providing software logic for an interface that permits a server digital media client to establish a server digital media account with a budget or credit permitting one storage of digital media files on the server up to a certain total file size and establishing a digital file transmission account rate.

8. A software module, or set of modules according to claim 7, wherein the software module, or set of modules provides the digital media server client with software logic and an interface that permits the digital media server client to establish or update their digital media account by setting a file transmission resolution parameter, as bits per second transmission rate parameter, and a total file size transmission time limit per a billing period.

9. A software module, or set of modules according to claim 8, wherein the software module, or set of modules provides the digital media server client with software logic and an interface that permits real-time monitoring of account use and account status by the digital media server client.

10. A software module, or set of modules according to claim 8, wherein the software module, or set of modules provides the digital media server client with software logic and an interface that permits real-time adjusting of account parameters during a billing period by the digital media server client.

11. A software implemented method comprising process steps that apply software implemented method steps with computer-executable software logic for creating or maintaining a local Or distributed computer digital media file repository and server management system, comprising logic for at least one digital media client billing system software or file management software including logic for receiving and transmitting digital media in a network environment in a bandwidth manner that is compatible with at least one digital media server client's account wherein:

(a) a method step comprising software implemented logic that provides for segmenting of at least one server client digital media account based on both file size for storage on the digital media server, or on an associated distributed digital media storage location, and a pre-defined "range of data" for transmitting the digital media to the digital media server client or to a third party with permission of the digital media server client, (b) a method step comprising software implemented logic permitting the digital media file repository and server management system to examine one or more of the metadata and file of a client provided digital media file to determine the digital media file type and size, (c) a method step comprising software implemented logic permitting the digital media file repository and server management system to examine one or more of the metadata and file of a client provided digital media file to determine the resolution of the digital media file type, the bit-rate and time, and the bandwidth size necessary to transmit the digital media file either to the digital media server client or to a third party with permission of the digital media server client, (d) a method step providing application of software logic permitting analysis of the information collected in (b) and (c) above to determine if the client provided digital media file is a conforming or non-conforming digital media file for the server digital media account as described in (a), and (e) a method step providing application of software logic permitting the system to store and utilize a conforming client provided digital media file, and to either reject non-conforming digital media files or to adjust them to conform to the server digital media account.

12. A method according to claim 11, further providing method steps that apply software logic associated with an interface that permit a server digital media client to establish a server digital media account with a budget or credit that permits such a media client to store one or more digital media files on the server having up to a certain total file size and to establish or revise a set digital file transmission account rate.

13. A method according to claim 12, wherein the method steps provide a digital media server client with software logic associated with an interface that permits the digital media server client to establish or update their digital media account by setting a file transmission resolution parameter, as bits per second transmission rate parameter, and a total file size transmission time limit per a billing period.

14. A method according to claim 13, wherein the method steps provide a digital media server client with software logic associated with an interface that permits real-time monitoring of account use and account status by the digital media server client.

15. A method according to claim 14, wherein the method steps provide a digital media server client with software logic associated with an interface that permits real-time adjusting of account parameters during a billing period by the digital media server client.

16. A method according to claim 11, wherein at least one method step provides application of software logic and an interface to permit the server digital media account client to choose to allow the system apply software or hardware implemented logic in order to conform any otherwise non-conforming digital media files by adjusting them to pre-set server digital media account parameters, or to notify the client that a digital media file is a non-conforming digital media file.

17. A method according to claim 16, wherein at least one method step provides application of software or hardware implemented logic to a client provided digital media file in order to conform the otherwise non-conforming digital media files to pre-set server digital media account parameters by adjusting one or more digital media file aspects.

* * * * *